United States Patent [19]

Ikeda et al.

[11] 4,284,346

[45] Aug. 18, 1981

[54] ELECTROPHOTOGRAPHIC COPYING MACHINE

[75] Inventors: Hiroshi Ikeda, Aichi; Seiichi Sakurai, Toyokawa, both of Japan

[73] Assignee: Minolta Camera Kabushiki Kaisha, Osaka, Japan

[21] Appl. No.: 28,326

[22] Filed: Apr. 9, 1979

[30] Foreign Application Priority Data

Apr. 15, 1978 [JP] Japan .................................. 53/44706

[51] Int. Cl.³ ...................... G03B 27/54; G03G 15/00; G03B 27/34

[52] U.S. Cl. .......................................... 355/67; 355/11; 355/57

[58] Field of Search ........................ 355/3 R, 8, 11, 71, 355/67, 67 S, 57, 60

[56] References Cited

U.S. PATENT DOCUMENTS

| | | | |
|---|---|---|---|
| 3,438,704 | 4/1969 | Schoen | 355/8 |
| 3,614,222 | 10/1971 | Post et al. | 355/60 X |
| 3,640,622 | 2/1972 | Shinozaki | 355/67 X |
| 3,883,244 | 5/1975 | Whitaker et al. | 355/71 |
| 3,917,393 | 11/1975 | Nier | 355/8 X |
| 4,080,057 | 3/1978 | Nakane et al. | 355/11 |
| 4,125,323 | 11/1978 | Ikeda et al. | 355/8 |

FOREIGN PATENT DOCUMENTS

| | | | |
|---|---|---|---|
| 52-68411 | 6/1977 | Japan | 355/67 |
| 52-80034 | 7/1977 | Japan | 355/67 |
| 52-147424 | 12/1977 | Japan | 355/67 |

*Primary Examiner*—Donald A. Griffin
*Attorney, Agent, or Firm*—Wenderoth, Lind & Ponack

[57] ABSTRACT

An electrophotographic copying machine comprises a transparent support for the support of an original to be copied, a photo-receptor, an optical projecting system for projecting an image of the original onto the photo-receptor and an exposure adjustment for controlling a pattern of distribution on the photo-receptor of rays of light carrying the image of the original. The optical projecting system includes a projecting lens assembly supported for movement between at least first and second positions wherein the image of the original can be reproduced on a copying paper in different magnifications. The exposure adjustment is positioned between the transparent support and the optical projecting system and is comprised of a fixedly supported light shielding member.

22 Claims, 20 Drawing Figures

ELECTROPHOTOGRAPHIC COPYING MACHINE

BACKGROUND OF THE INVENTION

The present invention generally relates to an electrophotographic copying machine of a type having a plurality of magnification modes and, more particularly, to an exposure adjustment for controlling the amount of the exposure falling on a photo-receptor surface in the electrophotographic copying machine to suit to a particular magnification mode.

Three types of exposure adjustment means for an electrophotographic copying machine of a type having a plurality of magnification modes have heretofore been well known. The first type is so designed as to adjust the width of an exposure slit or the intensity of light emitted by an illumination device, for example, an electric lamp, for adjusting the density of an image to be reproduced according to the density of an original image. The second type is, for example, disclosed in any one of the U.S. Pat. No. 3,438,704, patented on Apr. 15, 1969; the U.S. Pat. No. 3,883,244, patented on May 13, 1975; the U.S. Pat. No. 3,917,393, patented on Nov. 4, 1975; and the Japanese Laid-open Patent Publication No. 52-147424, laid open to public inspection on Dec. 7, 1977. This second type is generally so designed as to adjust the width of an exposure slit according to change of the magnification, thereby avoiding the possibility of variation in the amount of the exposure falling on the photo-receptor surface through the exposure slit which may occur as a result of the change of the magnification.

The third type is, for example, disclosed in the U.S. Pat. No. 4,125,323, patented on Nov. 14, 1978, (corresponding to the Japanese Laid-open Patent Publication No. 52-146630, laid open to public inspection on Dec. 6, 1977) and is so designed as to give the exposure slit a larger width at the center thereof than at the opposite ends thereof according to a change of the magnification, thereby to avoid variation in the amount of the exposure falling on the photo-receptor surface through the exposure slit, which may take place in a direction longitudinally of the exposure slit upon change of the magnification under the influence of the aperture efficiency of a projecting lens and the cosine law of the optical characteristic of the projecting lens.

The present invention pertains to an improvement in the third type of exposure adjustment referred to above. For the purpose of the present invention, the conventional exposure adjustment of the third type referred to above will be discussed with particular reference to FIGS. 1 and 2.

In FIG. 1, there is schematically illustrated an electrophotographic copying machine comprising a transparent support 1 for the support of an original 2 to be reproduced thereon, an illuminating lamp 3 supported for reciprocal movement between a stand-still position and a scanned position and adapted to be energized during the movement thereof from the stand-still position to the scanned position, a first reflective mirror 4 supported for movement together with the illuminating lamp 3 at a predetermined velocity V, and a second reflective mirror 5 supported for movement in a direction parallel to the direction of movement of the first reflective mirror 4 at a velocity which is equal to half the velocity V of movement of the first reflective mirror 4, that is, V/2. An image of the original 2 which has been scanned by the first reflective mirror 4 is projected onto a photoconductive surface of a photo-receptor drum 9, driven in one direction at a velocity equal to the velocity V of movement of the first reflective mirror 4, by way of third and fourth reflective mirrors 7 and 8 after having passed through a projecting lens 6. The intensity of the illumination carrying the original image and falling on the photoconductive surface of the rotating photo-receptor drum 9 is adjusted in its longitudinal direction by an exposure slit 12 defined by a pair of elongated slit defining members 10 and 11, prior to reaching the photoconductive surface of the photo-receptor drum 9.

The foregoing description applies where the copying machine is in a full-size reproduction mode, that is, in position to reproduce an image having a size equal to the size of the original image. However, a reduced size reproduction mode to reproduce an image having a size equal to, for example, 0.707 times the size of the original image can be attained by repositioning the projecting lens 6, the third reflective mirror 7 and the fourth reflective mirror 8 from the respective positions shown by the solid lines to positions shown by the broken lines and, at the same time, by causing the first and second reflective mirrors 4 and 5 to be driven at respective velocities of V/m and V/2m, wherein m represents the magnification, that is, 0.707 in this example. In addition, an additional slit defining member 13 having a shape as shown in FIG. 2 has to be pivoted to an operative position so as to protrude into the path of travel of rays of light carrying the original image to be projected onto the photoconductive surface of the photo-receptor drum 9. As best shown in FIG. 2, the additional slit defining member 13 is of a type having a width which is smaller at a central portion than at either of the opposite ends thereof so that, when the slit defining member 13 is in the operative position, it cooperates with the slit defining member 11 to define an exposure slit 12 having a shape having a width which is larger at the central portion than that at either of the opposite ends of said slit 12. With the additional slit defining member 13 in the operative position, variation in intensity of the illumination occurring in a longitudinal direction of a exposure slit by which the intensity of the illumination falling on the surface of the photo-receptor drum 9 through either of the opposite end portions of the exposure slit 12 is higher than that of the central portion of the same slit can advantageously be avoided and also an increase of intensity of illumination within the entire slit.

The reason the provision of the additional slit defining member 13 is necessary will now be described. In general, in an electrophotographic copying machine having the construction described above, it is well known that the intensity E′ of the illumination falling on the photoconductive surface of the photo-receptor drum 9 and the amount L of exposure to which the photoconductive surface of the photo-receptor drum 9 is actually exposed can be expressed by the following formulae.

$$E_1' = C_1 \cdot \frac{1}{\{F \cdot (1 + \beta)\}^2} \cdot \eta \cos^4 \theta \cdot Eo \qquad (1)$$

wherein Eo represents the intensity of illumination used to illuminate the original 2 placed on the transparent support 1; $\beta$ represents the magnification (e.g., 0.707); $\eta$ represents the aperture efficiency of the projecting lens 6; $\theta$ represents the half angle of view; F represents the aperture ratio of the projecting lens 6; and $C_1$ represents a constant which is determined by the following formula:

$$C_1 = K \cdot \tau \cdot n \cdot m$$

wherein K represents the reflection factor of the original, $\tau$ represents the transmission factor which is the sum of the transmission factors of the projecting lens and the transparent support, n represents the number of reflective mirrors employed and m represents the reflection factor of the reflective mirrors. The product of the aperture ratio F multiplied by the sum of one plus the magnification, that is, $F \cdot (1+\beta)$, represents the effective F-number which is generally determined by the F-number of the projecting lens 6 and the magnification $\beta$. It is also to be noted that the product of the aperture efficiency $\eta$ of the projecting lens 6 multiplied by $\cos^4\theta$ represents the illuminating ratio of the projecting lens which is determined by the aperture efficiency $\eta$ of the projecting lens and the fourth power of the cosine of the half angle of view $\theta$.

$$L = E' \cdot (1/Vo) \quad (2)$$

wherein d represents the width of the slit 12 and Vo represents the peripheral velocity of the photo-receptor drum 9.

On the other hand, the relationship between the illuminating ratio of the photoconductive surface of the photo-receptor drum and the distance from the optical axis is illustrated in FIG. 3 and it is clear from FIG. 3 that the illuminating ratio of the photoconductive surface of the photo-receptor drum decreases with an increase of the distance from the optical axis. Accordingly, it is obvious that, in order for the photoconductive surface of the photo-receptor drum to be uniformly exposed, the intensity of illumination directed onto the original supported by the transparent support should increase in such a manner as shown by the broken line in FIG. 3 with an increase of the distance from the optical axis. It is to be noted that the description concerning FIG. 3 is applicable where the projecting lens 6 employed has a focal length f of 280 mm.

Where the original is illuminated in the manner as discussed with reference to FIG. 3, the photoconductive surface of the photo-receptor drum will be uniformly exposed. This is particularly true where the copying machine is in the full-size production mode. However, when the copying machine is subsequently changed to the reduced size reproduction mode, not only does the effective F-number of the projecting lens vary to such an extent that the intensity of the illumination which may fall on the photoconductive surface of the photo-receptor drum may vary, but also the half angle of view varies incident to the repositioning of the projecting lens, which may result in variation in intensity of the illumination at local areas of the photoconductive surface of the photo-receptor drum.

By way of example, in the construction shown in FIG. 1, assuming that the width of the exposure slit 12 is fixed, the ratio of the amount of exposure to which the photoconductive surface of the photo-receptor drum is exposed during the reduced size reproduction mode relative to the amount of exposure to which the photoconductive surface of the photo-receptor drum is exposed during the full-size reproduction mode can be calculated as follows.

$$\frac{0.707L}{1.0L} = \frac{1/(1+0.707)^2}{(1+1)^2} = \frac{(1+1)^2}{(1+0.707)^2} \approx 1.373 \quad (3)$$

In other words, during the reduced size reproduction mode, the amount of exposure to which the photoconductive surface of the photo-receptor drum is exposed is higher by 37% than that during the full-size reproduction mode, tending to give rise to over-exposure.

In addition, the ratio of the amount Lo of exposure to which the photoconductive surface of the photo-receptor drum is exposed through a central portion of the exposure slit relative to the amount $L_{150}$ of exposure to which the photoconductive surface of the photo-receptor drum is exposed through either of the opposite end portions of the exposure slit, both occurring during the reduced size (x0.707) reproduction mode, can be calculated as follows when the original is illuminated by light of an intensity equal to that during the full-size reproduction mode.

$$\frac{L_{150}}{Lo} = \frac{0.799/0.736}{1} = \frac{0.799}{0.736} \approx 1.09 \quad (4)$$

In other words, the amount of exposure falling on either of the end portions of the photo-receptor drum is higher by about 9% than that falling on a central portion of the photo-receptor drum, tending to give rise to an irregular concentration of the reproduced image. It is to be noted that in calculating the ratio of the amount Lo of exposure relative to the amount $L_{150}$ of exposure, no variation in intensity of the illuminating light emitted from the lamp is taken into consideration and, if this variation in intensity of the illuminating light emitted from the lamp, which often occurs in practice, is taken into consideration, the difference in intensity of the illumination between the central portion and either of the opposite end portions of the photo-receptor drum will be larger than that calculated in the above manner.

In view of the above, in the electrophotographic copying machine of the type disclosed in the U.S. Pat. No. 4,125,323, the invention of which has been assigned to the same assignee of the present invention, the slit defining member of the type described above and shown in FIG. 2 is necessarily employed. However, so far as two magnification modes, that is the full size reproduction mode and the reduced size reproduction mode, are concerned, the exposure adjustment by means of the additional slit defining member 13 in addition to the slit defining members 10 and 11 such as disclosed in the U.S. Pat. No. 4,125,323, is satisfactory. However, where the number of magnification modes is three or more, a correspondingly increased number of slit defining members are required and this in turn requires a complicated mechanism for selectively bringing the slit defining members into an operative position one at a time.

SUMMARY OF THE INVENTION

Accordingly, the present invention has been made to substantially eliminate the above described inconveniences inherent in the prior art exposure adjustment means and has for its essential object to provide an improved exposure adjustment means which is simple in construction, but effective to avoid a possible irregular amount of exposure falling on the photoconductive surface which may occur in a direction lengthwise of an exposure slit through which rays of light carrying an image to be reproduced are projected.

BRIEF DESCRIPTION OF THE DRAWINGS

These and other objects and features of the present invention will become apparent from the following description taken in conjunction with a preferred embodiment thereof with reference to the accompanying drawings, in which.

DETAILED DESCRIPTION OF THE INVENTION

Figure 1:
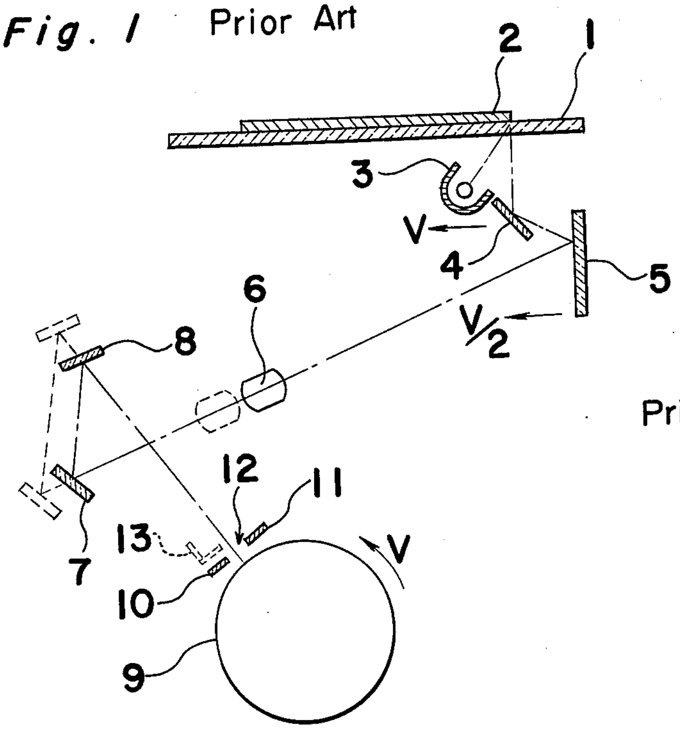
Fig. 1 Prior Art
FIG. 1 is a schematic diagram showing a conventional exposure adjustment means employed in an electrophotographic copying machine, reference to which has already been made.
Figure 2:
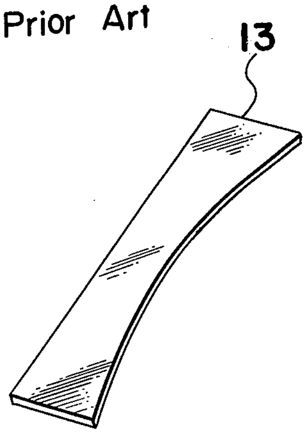
Fig. 2 Prior Art
FIG. 2 is a perspective view of a slit defining member employed in the exposure adjustment means shown in FIG. 1.
Figure 3:
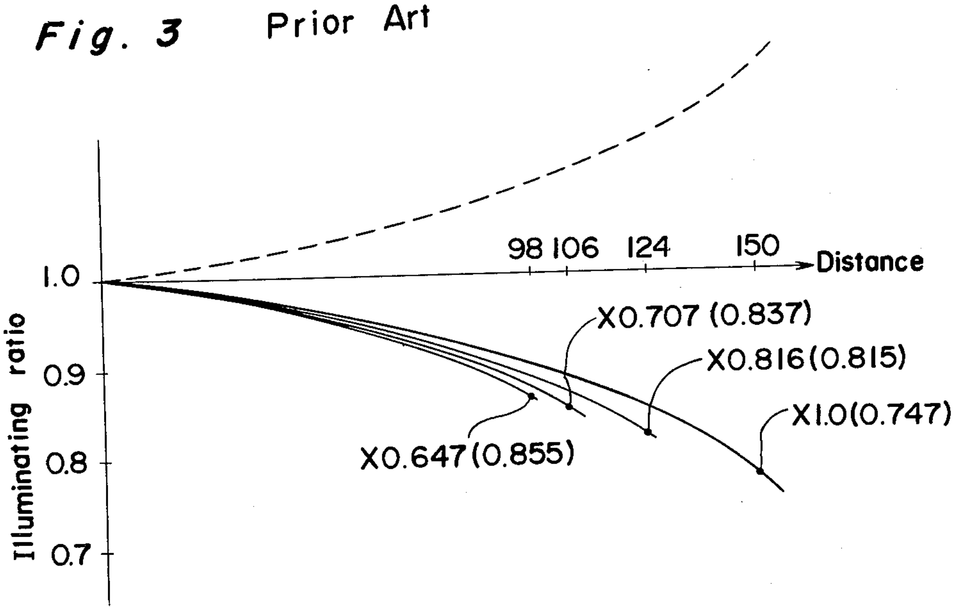
Fig. 3 Prior Art
FIG. 3 is a graph showing the relationship between the intensity of the illumination falling on a photoconductive surface and the distance from the optical axis.

Before the description of the present invention proceeds, it is to be noted that like parts are designated by like reference numerals throughout the accompanying drawings.

Figure 4:
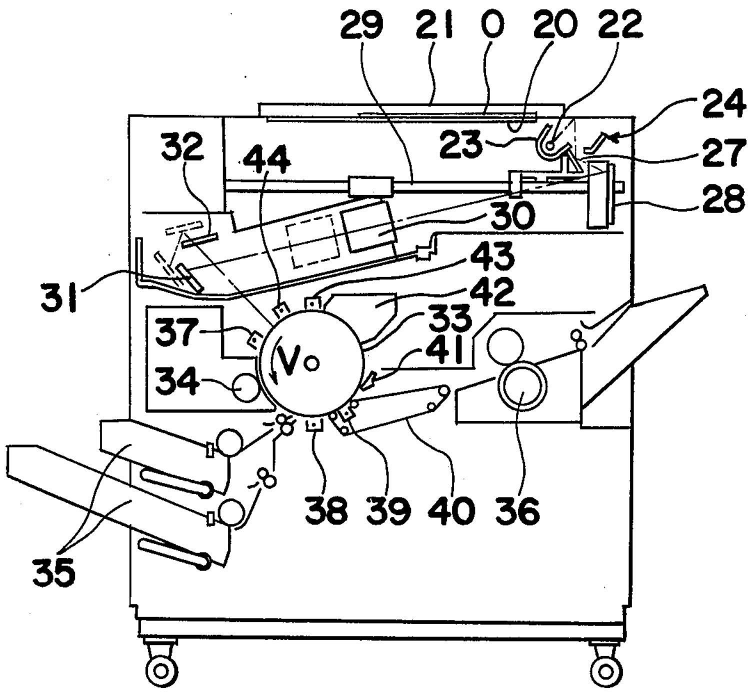
FIG. 4 is a schematic side elevational view showing an electrophotographic copying machine to which the present invention is applied.

Referring first to FIG. 4, an electrophotographic copying machine to which the present invention is applied comprises a transparent support plate 20 for the support of an original 0, a flexible or rigid cover 21 for covering the original 0 from above and an illuminating unit including an illuminating lamp 22 which is connected to a light control means constituted by an electric power control circuit (not shown). The illuminating unit further includes a reflective shade 23 so designed as to reflect the rays of light emitted from the lamp 22 towards the transparent support 20 to illuminate the original 0 placed on the transparent support 20. This illuminating unit is adapted to be moved together with a slit defining structure 24 and a first reflective mirror 27 at a predetermined velocity V along a guide rail 29 by any known drive mechanism to illuminate the original 0 on the transparent support 20 while scanning such original 0. A second reflective mirror 28 is also moved at a predetermined velocity V/2 along the guide rail 29. Rays of light reflected from the original 0 and carrying an image of the original are transmitted to a projecting lens assembly 30 and then projected by third and fourth reflective mirrors 31 and 32 onto a photoconductive surface of a photo-receptor drum 33 being rotated in one direction at a peripheral velocity equal to the velocity V of movement of the illuminating unit so that an electrostatic latent image having a configuration corresponding to the original image so projected can be formed on the photoconductive surface of the photoreceptor drum 33 as is well known to those skilled in the art.

During the continued rotation of the photo-receptor drum 33, the electrostatic latent image on the photoconductive surface is brought to a developing station where a powdery developing material is dispensed by a developer unit 34 onto the photoconductive surface to develope a toner image. This toner image on the photoconductive surface of the photoreceptor drum 33 is subsequently brought to a transfer station where the toner image is transferred onto a sheet of final support material, for example, a copying paper fed from either one of paper supply units 35, the sheet of final support material with the toner image so transferred being passed through a fixing station where heat is applied thereto from a heating roll assembly 36 to fix the toner image and then being ejected out of the copying machine.

In FIG. 4, reference numeral 37 designates a charge eraser for erasing unnecessary electrostatic charge at either of the opposite ends of the electrostatic latent image on the photoconductive surface of the photoreceptor drum 33, reference numeral 38 designates a transfer corona charger, reference numeral 39 designates an A.C. charger, reference numeral 40 designates a substantially endless belt for the transportation of the sheet of final support material through the fixing station, reference numeral 41 designates a separator pawl, reference numeral 42 represents a cleaner, reference numeral 43 represents an eraser and reference numeral 44 represented a corona charger, all of which are well known as to the construction and arrangement thereof and, therefore, the details thereof are omitted for the sake of brevity.

It is to be noted that the copying machine to which the present invention is applied is of a type having a plurality of magnification modes, for example, a full-size reproduction mode, a substantially 66% reduced size reproduction mode (the magnification being x0.816) and a substantially 50% reduced size reproduction mode (the magnification being $\times$0.707). Accordingly, when the copying machine is switched from one magnification mode to another by repositioning the projecting lens assembly 30 the third and fourth reflective mirrors 31 and 32 are correspondingly moved by a mechanism which will be described later in operative association with the movement of the projecting lens assembly 30.

Figure 5:
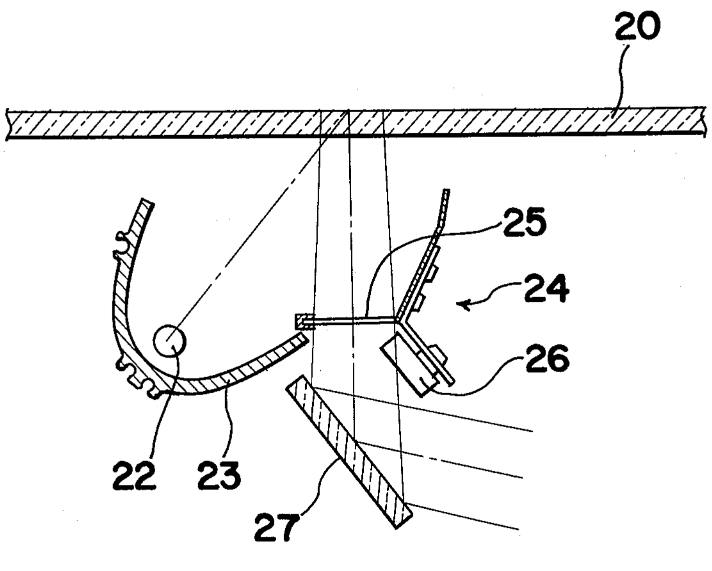
FIG. 5 is a side sectional view, on an enlarged scale, showing the details of an illuminating unit and its associated parts shown in FIG. 4.

The slit defining structure 24 is best shown in FIG. 5. This slit defining structure 24 is positioned substantially intermediately between the transparent support 20 and the first reflective mirror 27 and comprises a slit defining plate member having a slit 25 therein and a light control plate 26 for adjusting the amount of light passing through the slit 25. The light control plate 26 can have a construction such as disclosed in the U.S. Pat. No. 4,080,057 referred to above and is operable to vary the width of portions of the slit 25 in a direction lengthwise of the slit so that any possible irregular illumination which may occur in a direction lengthwise of the slit can advantageously be avoided.

According to the present invention, the slit defining structure 24 is positioned substantially intermediately between the transparent support 20 and the projecting lens assembly 30 so that rays of light reflected from the original 0, and, therefore, carrying the original image can be transmitted to the projecting lens assembly 30 after the amount of such reflected light has been regulated by the slit 25 during the passage through said slit 25. Because of this, no adjustment of the width of the slit 25 over the entire length thereof is necessary even when the copying machine is switched from one magnification mode to another.

Figure 6:
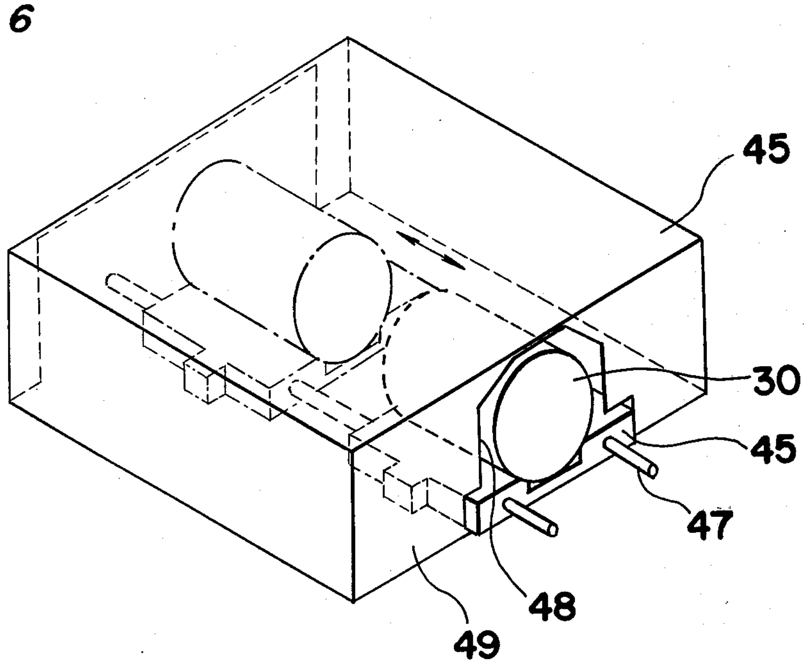
FIG. 6 is a perspective view, on an enlarged scale, of a projecting lens assembly and its associated parts which are employed in the electrophotographic copying machine embodying the present invention.

Referring to FIG. 6 showing the manner by which the projecting lens assembly 30 is supported, the projecting lens assembly 30 is stationarily mounted on a lens holder 45 which is in turn mounted on a pair of juxtaposed guide rails 47 for movement between first and second positions through an intermediate position within a shielding casing 46 for shielding the projecting lens assembly 30 from the ambient light, said first and second and intermediate positions of the projecting lens assembly 30 being respectively the positions for the full-size reproduction mode, the 50% reduced size reproduction mode and the 66% reduced size reproduction mode. The projecting lens assembly 30 is driven reciprocally between the first and second positions past the intermediate position in the manner described above by a drive mechanism having a construction which will be described later, and the shielding casing 46 has a shaped opening 48 defined in one side wall 49 thereof facing the second reflective mirror 28, which side wall 49 serves as a light shielding plate.

The operation of the side wall 49 as a light shielding plate will now be described with particular reference to FIG. 7. It is to be noted that in the following discussion with reference to FIG. 7 it is assumed that the projecting lens assembly 30 employed is of a type having a focal length of 280 mm, an aperture ratio of 4.5, a diameter of 78.8 mm, a length of 94 mm and a distance between the principle points of 6.73 mm, while the light shielding plate 49 has an opening with a width of 95 mm. If the projecting lens assembly 30 is moved stepwise from the position shown in solid lines in FIG. 7 where one end of the projecting lens assembly 30 facing the original 0 on the transparent support 20 for receiving the image reflected from the first and second reflective mirrors 27 and 28 protrudes outwardly of the opening 48 in the light shielding plate 49 a distance of 4.2 mm as in a direction away from the second reflective mirror 28 to any one of positions which are respectively spaced 63 mm, 116 mm and 152.8 mm and which correspond respectively to magnifications of ×0.816, ×0.707 and ×0.647, it will readily be seen from FIG. 7 that some of the light entering the projecting lens assembly 30 after having been reflected from the second reflective mirror 28 when the projecting lens assembly 30 is positioned in the solid line position, that is, during the full-size reproduction mode, will be cut off, but some light is cut off by the light shielding plate 49 when the projecting lens assembly 30 is in any one of the other positions. Moreover, the amount of the light cut off by the light shielding plate 49 increases with an increase of the distance of the movement of the projecting lens assembly 30 from the position shown by the solid lines. As stated above, since the light that has passed through the slit 25 must pass through the opening in the light shielding plate 49 prior to the entry into the projecting lens assembly 30, the amount of the light cut off by the light shielding plate 49 increases gradually in a direction towards the opposite ends of the slit, thereby giving rise to a similar effect obtained by an exposure adjustment means such as disclosed in U.S. Pat. No. 4,125,323.

Figure 7:
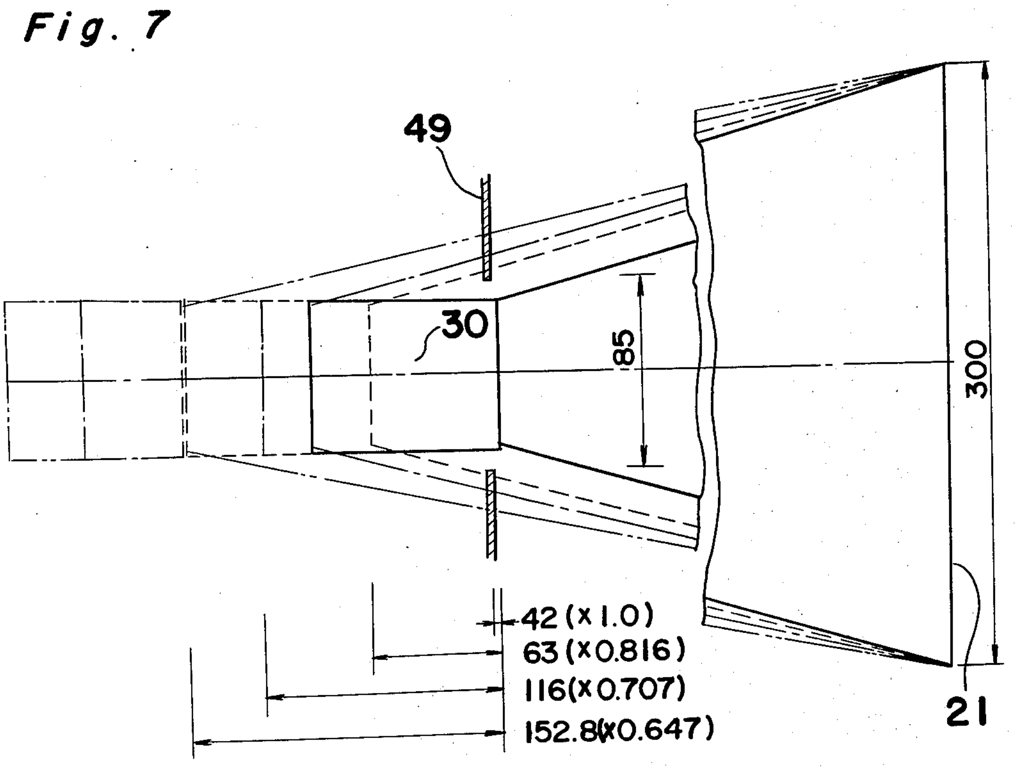
FIG. 7 is a schematic diagram showing a shielding plate, forming a part of the exposure adjustment means according to the present invention, relative to bundles of rays of light projected through the projecting lens at different positions.
Figure 8:
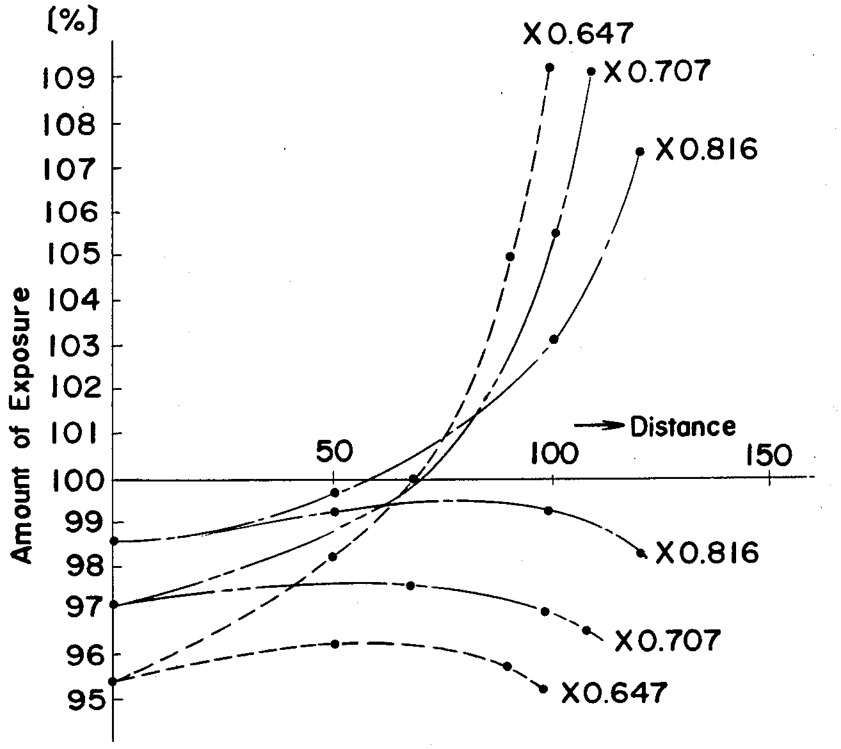
FIG. 8 is a graph showing the relationship between the amount of the exposure falling on the photoconductive surface through the shielding plate and the distance from the optical axis.

More specifically, in the example now under discussion with reference to FIG. 7, at a magnification of x0.707, if 19% of the light ready to enter the projecting lens assembly is cut off at each end portion, the amount Lo of the exposure falling on the central portion of the photoconductive surface of the photo-receptor drum and the amount $L_{150}$ of the exposure falling on the opposite end portions of the same photoconductive surface of the photo-receptor drum can be substantially equalized as shown in FIG. 8 so that the possibility of irregular amount of exposure falling on the photoconductive surface can advantageously be avoided. This can readily be understood from the graph of FIG. 8 which illustrates relationships between the amount of the exposure falling on the photoconductive surface and the distance from the point midway of the length of the photo-receptor drum to the respective opposite ends thereof during the various magnification modes, the amount of exposure during the full-size reproduction mode being assumed to be 100%. As shown in the upper curves in FIG. 8, when the light shielding plate 49 is not used, the curves each show that the amount of exposure is increased with an increase of the distance from the optical axis, that is, the amount of exposure in the end portions is substantially 10% higher than that in the central portion in the respective magnification mode.

On the other hand, when the light shielding plate 49 is used, the lower curves each show the amount of the exposure is substantially equalized in the direction lengthwise of the slit, that is, with the increase of the distance from the optical axis. The variation between the highest and the lowest amount of the exposure is controlled so as to be substantially within 1%. Accordingly, if the copy magnification mode is switched over from one to another, the irregular amount of the exposure falling on the photoconductive surface in the direction lengthwise of the slit can advantageously be avoided by using the light shielding plate 49.

It is also to be noted that, although the amount of the exposure falling on the photoconductive surface of the photo-receptor drum becomes lower when the light about to enter the projecting lens assembly 30 is cut off by the light shielding plate 49 that when the same is not cut off, the variation in the amount of the exposure falling on the photoconductive surface within the entire slit is small so that there is less influence on the quality of the ultimately reproduced image in comparison with the variation of the amount of the exposure in the direction lengthwise of the slit when the light shielding plate 49 is not used.

In the foregoing embodiment, although the light shielding plate 49 has been described as being fixed, it may be movably supported to enable the adjustment of the amount of light to be cut off before the passage through the projecting lens assembly 30.

The drive mechanism for the projecting lens assembly 30 and the drive mechanism for the reflective mirrors will now be described.

It is to be noted that the following embodiment will be described for three magnification modes x1.0, x0.816 and x0.707 selected from among the four magnification modes shown in FIG. 7.

Figure 9:
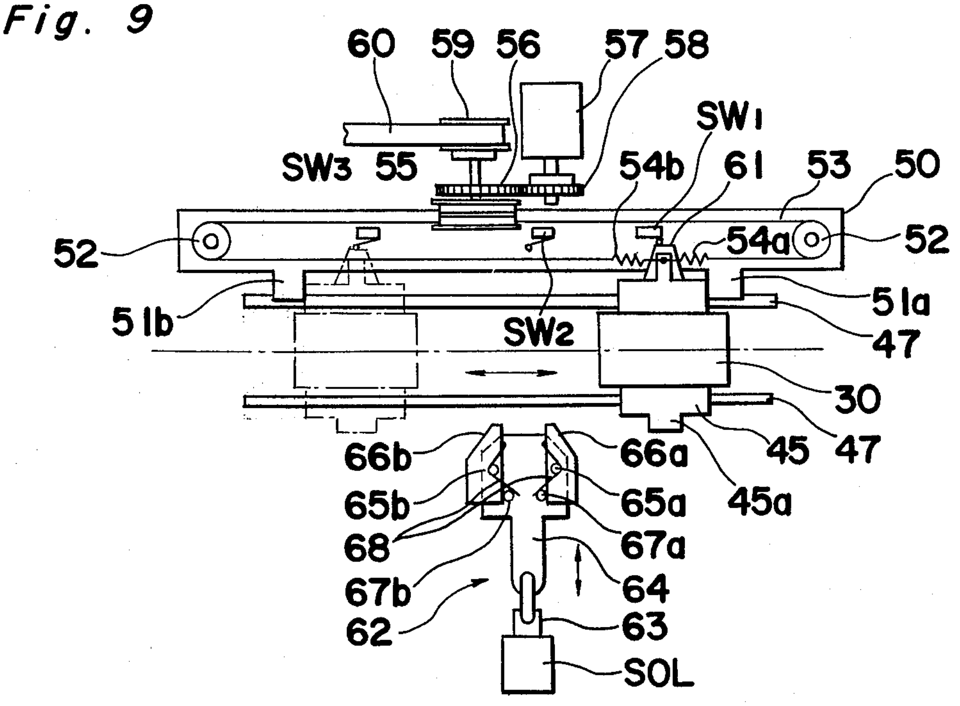
FIG. 9 is a schematic diagram showing a drive mechanism for driving the projecting lens assembly.

Referring to FIG. 9 which illustrates the drive mechanism for the projecting lens assembly 30, the drive mechanism includes an elongated side plate 50 having a length sufficient to cover the entire stroke of the lens holder 45. This side plate 50 carries a pair of spaced pulleys 52 rotatably mounted on respective end portions of the side plate 50. A cable 53 has its opposite ends rigidly secured to the holder 45 by respective tension adjusting springs **54*a* and 54*b*, a substantially intermediate portion thereof extending around one of the pulleys 52 and then around the other of the pulleys 52 so that movement of the cable 53 effected in a manner as will be described later is accompanied by a corresponding movement of the projecting lens assembly 30 mounted on the holder 45. For causing the cable 53 to move in the manner described above, a portion of the cable 53 extending between the pulleys 52 has a few convolutions wound around a drive pulley 55. This drive pulley 55 has a driven gear 56 rigidly connected thereto or otherwise formed integrally therewith, said driven gear 56 being held in constant mesh with a drive gear 58 which is rigidly mounted on an output shaft of an electrically driven reversible motor 57**.

The drive motor 57 provides a drive not only to the drive pulley 55 for moving the cable 53, but also to a mirror carriage which will be described later through a substantially endless belt 60 extending around a pulley 59 rotatable together with either the pulley 55 or the gear 56 as will be described in detail later.

As hereinbefore described, the projecting lens assembly 30 is movable together with the holder 45 between the first and second positions through the intermediate position. The first position of the projecting lens assembly 30 represents the largest magnification mode, that is, the full-size reproduction mode in the instance as shown; the second position of the projecting lens assembly 30 represents the smallest magnification mode, that is, x0.707 magnification mode wherein about 50% reduction is effected relative to the surface area of the original; and the intermediate position represents the intermediate magnification mode, that is, x0.816 magnification mode wherein about 66% reduction is effected relative to the surface area of the original. Structurally, the first, intermediate and second positions of the projecting lens assembly 30 are respectively defined by microswitches SW1, SW2 and SW3 rigidly secured to the side plate 50 and arranged in the path of travel of a cam projection 61 rigidly mounted on or otherwise formed integrally with the holder 45, so that when the projecting lens assembly 30 is brought to the first, intermediate or second position, the corresponding switch SW1, SW2 or SW3 is opened to interrupt the supply of an electric power to the drive motor 57. For avoiding an overrun of the projecting lens assembly 30 beyond any of the first and second positions, fixed stops **51*a* and 51*b* are provided separately of, or otherwise integrally formed with, the side plate 50 and arranged at respective positions corresponding to the first and second positions of the projecting lens assembly 30**.

A positioning device 62 for firmly holding the projecting lens assembly 30 at the intermediate position immediately after the assembly 30 has been moved thereto from either the first position or the second position is arranged on one side of the guide rails 47 opposite to the microswitch SW2. This positioning device 62 comprises a solenoid unit SOL having a plunger 63 movable between retracted and projected positions, said solenoid unit SOL being adapted to be energized to move the plunger 63 from the retracted position towards the projected position when one of several magnification selector switches (not shown) which is associated with the intermediate magnification mode is manipulated by an operator of the copy machine.

The positioning device 62 further comprises a carrier block 64 connected to the plunger 63 for linear movement together with said plunger 63, a pair of blocking pieces **66*a* and 66*b* pivotally mounted on the carrier block 64 by respective support pins 65*a* and 65*b*, a pair of positioning pins 67*a* and 67*b* rigidly mounted on the carrier block 64, and a pair of biasing springs generally identified by 68 and shown in the form of a wire spring. This positioning device 62 is so designed that when the projecting lens assembly 30 is held in either one of the first and second positions, each of the blocking pieces 66*a* and 66*b* is held in an engageable position, as shown in FIG. 9, by the action of the corresponding biasing spring 68 with one end engaged with the corresponding positioning pin 67*a* or 67*b*. Accordingly, these blocking pieces 66*a* and 66*b*** in their respective engageable positions extend substantially in parallel relation to each other.

The operation of the drive mechanism including the position device 62 thus far described with particular reference to FIG. 9 will now be described with reference to FIGS. 10(*a*) to 10(*d*).

Figure 10:
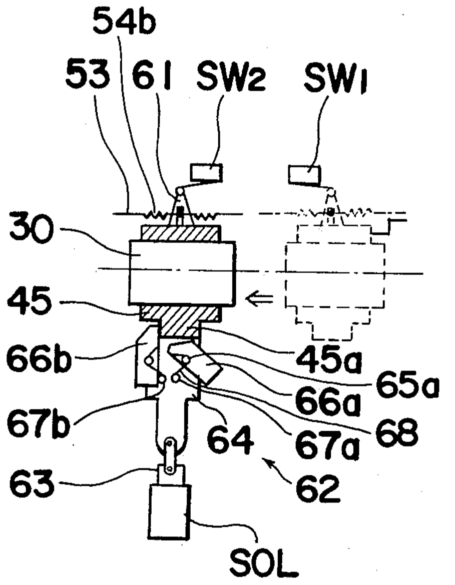
FIGS. 10(*a*) to 10(*d*) are schematic views showing a stop mechanism in different operative positions.
Figure 10:
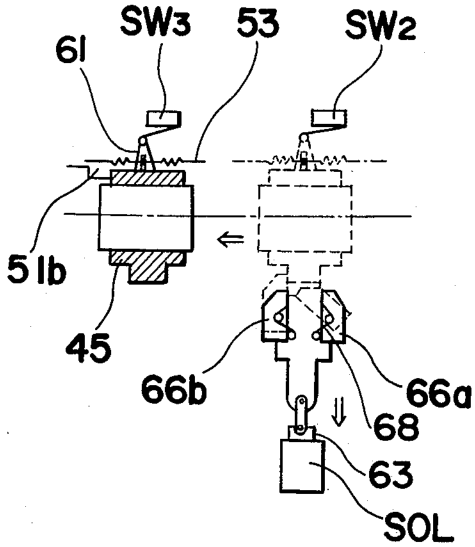
Figure 10:
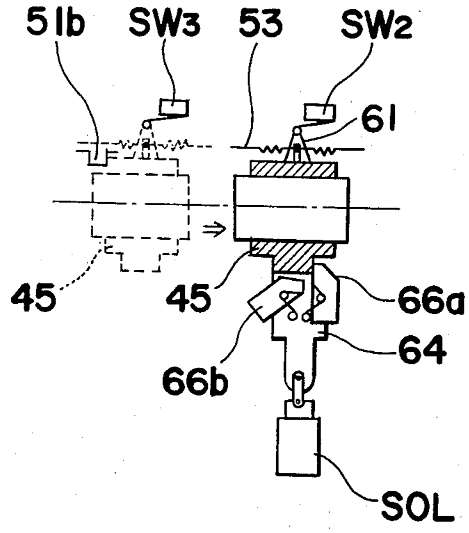
Figure 10:
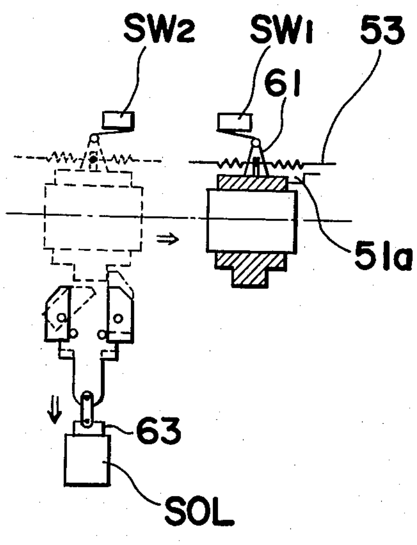

Assuming that the projecting lens assembly 30 is held at the first position as shown by the broken lines in FIG. 10(*a*), the manipulation of the magnification selector switch (not shown) associated with the intermediate magnification mode results in a switching of a drive circuit for the drive motor 57 to energize the motor 57, whereby the projecting lens assembly 30 on the holder 45 is moved in a direction from the first position towards the left as viewed in FIG. 10. During the movement of the projecting lens assembly 30 towards the left, the projection **45*a* on the holder 45 engages the blocking piece 66*a*, thereby causing the latter to pivot counterclockwise about the support pin 65*a* against the biasing spring 68 until the projection 45 abuts the blocking piece 66*b* as shown in FIG. 10**(*a*). Simultaneously with the engagement of the projection **45*a* of the holder 45 with the blocking piece 66*b*, the microswitch SW2 is opened by the cam projection 61 to interrupt the supply of the electric power to the drive motor 57. In this manner, the projecting lens assembly 30** is brought to the intermediate position.

It is, however, to be noted that there may be the possibility that the projecting lens assembly 30 tends to move further towards the second position, even after the supply of the electric power to the motor 57 has been interrupted, under the influence of the inertia force of the drive motor 57. In practice, according to the present invention, since counterclockwise rotation of the blocking piece 66*b* does not occur subsequent to the engagement of the projection 45*a* to the blocking piece 66*b* by the reason of the employment of the positioning pin 67*b* which blocks the counterclockwise rotation of the blocking piece 66*b*, not only is this possiblity advantageously avoided, but also the inertia force of the drive motor 57 is advantageously be counteracted by the tension adjusting spring 54*b* which is stretched to absorb the inertia force of the motor 57. Therefore, the projecting lens assembly 30 is firmly held in the intermediate position.

If another magnification selector switch is manipulated to switch over from the intermediate magnification mode to the smallest magnigication mode, the drive circuit for the motor 57 is switched over to drive the motor 57 on one hand and to actuate the solenoid unit SOL to move the plunger 63 from the projected position to the retracted position on the other hand as shown by the broken line in FIG. 10(*b*). As the solenoid plunger 63 is moved from the projected position towards the retracted position, the blocking piece 66*b* which has been held in position to block the movement of the projecting lens assembly 30 as shown in FIG. 10(*a*) is retracted out of the path of travel of the projection 45*a* in the holder 45, thereby disengaging from the projection 45*a* while the blocking piece 66*a* which has been rotated counterclockwise as shown in FIG. 10(*a*) is caused to pivot clockwise back to the original position by the action of the biasing spring 68. Accordingly, driven by the motor 57, the projecting lens assembly 30 moves from the intermediate position towards the second position.

Upon arrival of the projecting lens assembly 30 at the second position where the holder 45 is engaged with the stop 51*b*, the microswitch SW3 is opened by the cam projection 61 to interrupt the supply of the electric power to the drive motor 57, whereby the projecting lens assembly 30 is held at the second position as shown in FIG. 10(*b*).

When, with the projecting lens assembly 30 in the second position, it is desired to move the assembly to the intermediate position as shown in FIG. 10(*c*), it is only necessary to reverse the direction of rotation of the drive motor 57. Similarly, where the projecting lens assembly 30 in the intermediate position is desired to be moved to the first position as shown in FIG. 10(*d*), it is only necessary to actuate the solenoid unit SOL to move the plunger 63 from the projected position towards the retracted position on one hand and to reverse the direction of rotation of the drive motor 57 on the other hand.

Figure 11:
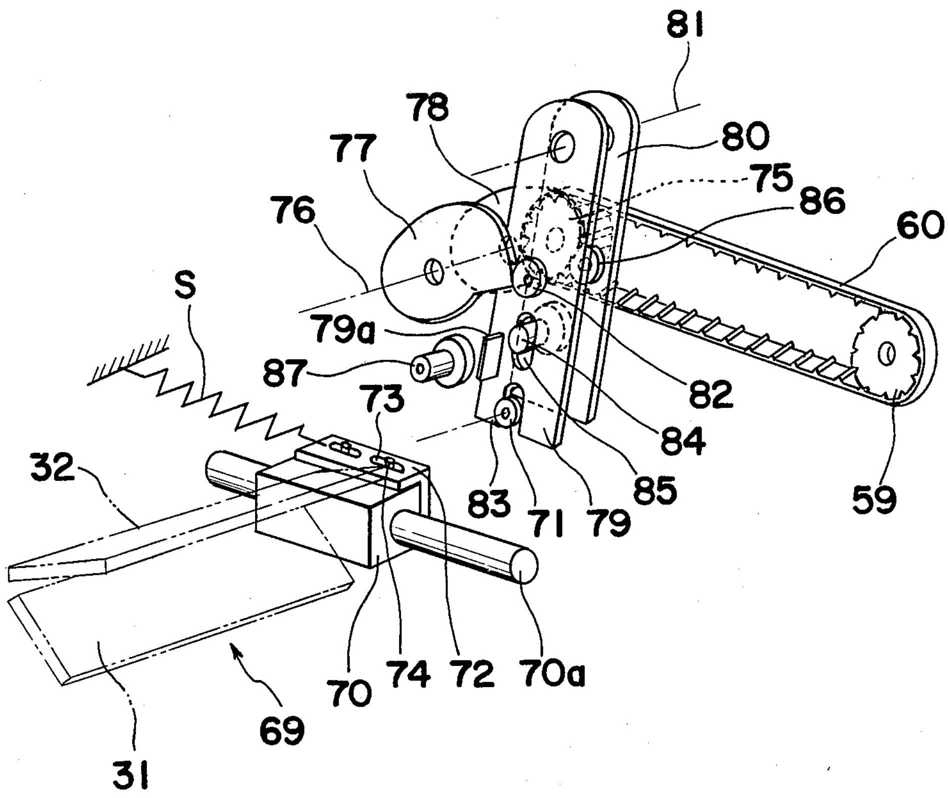
FIG. 11 is a perspective view of a mechanism for driving reflective mirrors employed in the copying machine shown in FIG. 4.
Figure 12A:
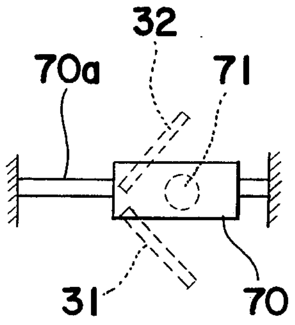
FIGS. 12(*a*) to 12(*c*) are schematic diagrams showing the reflective mirrors in different positions.
Figure 12B:
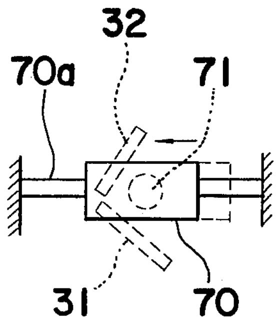
Figure 12C:
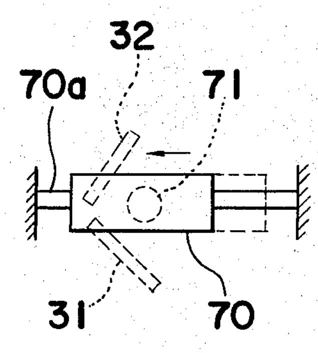
Figure 13A:
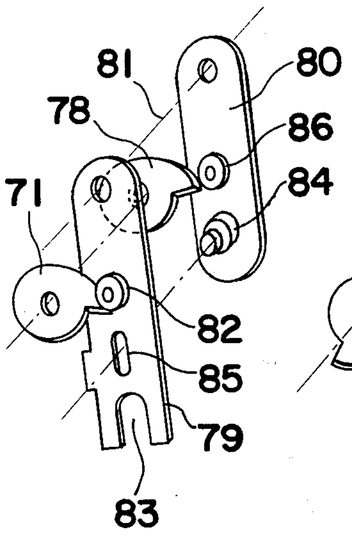
FIGS. 13(*a*) to 13(*c*) are schematic exploded views of a portion of the mirror drive mechanism of FIG. 11 in different positions respectively associated with the positions of the reflective mirrors shown in FIGS. 12(*a*) to 12(*c*).
Figure 13B:
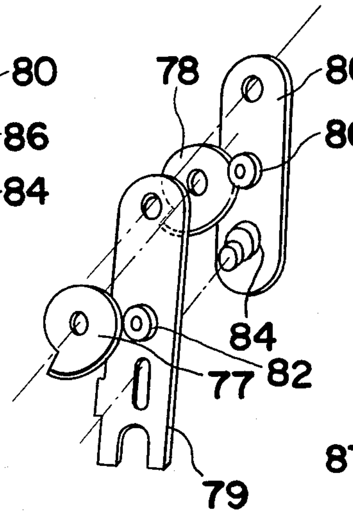

Referring now to FIGS. 11 to 13, the mirror carriage is identified by 70. This mirror carriage 70 has an assembly 69 of the third and fourth reflective mirrors 31 and 32 rigidly mounted thereon and is mounted on a guide rail 70*a* for movement between first and second positions through a substantially intermediate position, said first, intermediate and second positions of the mirror carriage 70 respectively corresponding to the first, intermediate and second positions of the projecting lens assembly 30. However, the mirror carriage 70 is normally biased toward the second position by a biasing spring S which may be a tension spring, but is held in the first position when and so long as the projecting lens assembly 30 is in the first position by means which will be described later. A carrier plate 72 having a substantially L-shaped configuration having a roller 71 rotatably mounted thereon is mounting the mirror carriage 70 by means of a plurality of, for example, two, fitting screws or pins 74 which extend through respective slots 73 in said carrier plate 72. Because the carrier plate 72 is mounted on the mirror carriage 70 in the manner described above, it will readily be seen that by loosening and tightening the mounting screws 74, a fine adjustment of the position of the carrier plate 72 relative to the mirror carriage 70 can be made. The mirror carriage 70 is movably mounted on the guide rail 70*a* with the roller 71 protruding in a direction perpendicular to the longitudinal axis of the guide rail 70*a*.

The endless belt 60 which has been described as extending around the drive pulley 59 in connection with FIG. 10 also extends around a driven pulley 75 rigidly mounted on a shaft 76 journalled to a frame (not shown) of the copying machine. The shaft 76 also has a pair of spaced cam wheel 77 and 78 rigidly mounted thereon with a spacer (not shown) position between these wheels 77 and 78.

A pair of spaced elongated levers 79 and 80 are pivotally mounted on a shaft 81 supported by the frame (not shown) and carry respective cam followers 82 and 86 which are engaged with the associated peripheral cam faces of the cam wheels 77 and 78. The free end of the lever 79 remote from the shaft 81 has an engagement recess 83 in which the roller 71 is engaged, and the free end of the lever 80, which is shorter than the lever 79, has an adjustment member 84 threadingly and eccentrically engaged with the lever 80 and extending through a slot 85 in the lever 79. The adjustment member 84 is operable in such a manner that, when the adjustment member 84 is turned in either direction about the longitudinal axis thereof, the spacing between the free ends of the respective levers 79 and 80 is adjusted by the levers 79 and 80 pivoting relative to each other about the longitudinal axis of the shaft 81, the detailed operation of the adjustment member 84 being described later. The lever 79 has an abutment 79*a* rigidly connected thereto or otherwise integrally formed therewith, said abutment 79*a* being engagable with an adjustable stop 87 which can be an eccentric screw member and which can be secured to a side plate (not shown) forming a part of the frame of the copying machine.

Figure 13C:
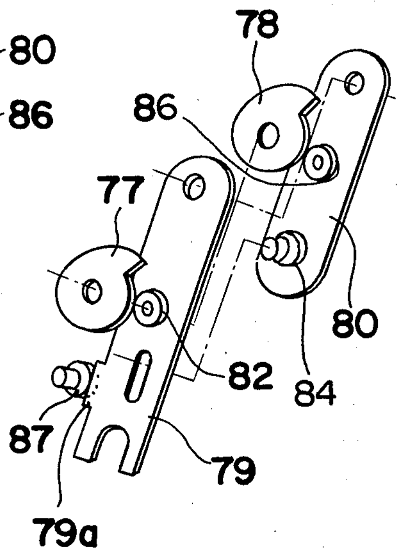

In the construction described above, it will readily be seen that the pivotal movement of the levers 79 and 80 is transmitted to the mirror carriage 70 through the roller 71 engaged in the engagement recess 83 to cause said mirror carriage 70 to move along the guide rail 70*a*. FIGS. 12(*a*), 12(*b*) and 12(*c*) illustrate the mirror carriage 70 held in the first, intermediate and second positions respectively. The cam wheels 77 and 78 are so shaped that, when the projecting lens assembly 30 is held in the first position as shown by the broken lines in FIG. 10(*a*) or by the solid lines in FIG. 10(*d*), the cam follower 82 on the lever 79 abuts against the peripheral cam face of the cam wheel 77 as best shown in FIG. 13(*a*) by the action of the biasing spring S which, because of the engagement of the roller 71 in the engagement recess 83 in the lever 79, tends to bias the levers 79 and 80 in a direction clockwise about the shaft 81 as viewed in FIG. 11, thereby holding the mirror carriage in the first position as shown in FIG. 12(*a*). On the other hand, when the mirror carriage 70 is held in the intermediate position as shown in FIG. 12(*b*), the cam follower 86 on the lever 80 abuts against the peripheral cam face of the cam wheel 78 as best shown in FIG. 13(*b*) with the cam follower 82 spaced from the peripheral cam face of the cam wheel 77. However, when the mirror carriage 70 is in the second position as shown in FIG. 12(c), both of the cam followers 82 and 86 are spaced from the associated peripheral cam faces of the cam wheel 77 and 78, but the abutment 79, on the lever 79 is engaged with the adjustable stop 87 as best shown in FIG. 13(c).

More specifically, referring to FIGS. 9 to 13, assuming that the projecting lens assembly 30 is moved from the first position towards the intermediate position as shown in FIG. 10(a), the mirror carriage 70 is correspondingly moved from the first position towards the intermediate position as shown in FIG. 12(b) by the action of the biasing spring S. As the thus moved mirror carriage 70 approaches the intermediate position, the cam follower 82 on the lever 79 disengages from the peripheral cam face of the cam wheel 77 and, simultaneously therewith, the cam follower 86 on the lever 80 is brought into contact with the peripheral cam face of the cam wheel 78. When the mirror carriage 70 is held in the intermediate position, the cam follower 86 is engaged with the peripheral cam face of the cam wheel 78 as best shown in FIG. 13(b). It is to be noted that, since the mirror carriage 70 is brought to the intermediate position simultaneously with the arrival of the projecting lens assembly 30 at the intermediate position, the endless belt 60 no longer runs and, therefore, the rotation of the cam wheels 77 and 78 is stopped.

If the projecting lens assembly 30 in the intermediate position is subsequently moved towards the second position as shown in FIG. 10(b), the lever 80 is further pivoted clockwise about the shaft 81 together with the lever 79 while cam follower 86 on the lever 80 rolls along the peripheral cam face of the cam wheel 78 while rotated together with the shaft 76. Accordingly, the mirror carriage 70 is corresponding moved from the intermediate position towards the second position, being pulled by the biasing spring S. Shortly before the arrival of the mirror carriage 70 at the second position, the cam follower 86 on the lever 80 disengages from the peripheral cam face of the cam wheel 78. At the time when the mirror carriage 70 arrives at the second position as shown in FIG. 12(c), the abutment 79a on the lever 79 is engaged with the adjustable stop 87 as best shown in FIG. 13(c), thereby firmly holding the mirror carriage 70 in the second position.

From the foregoing, it will readily be seen that when the drive motor 57 is reversed to move the projecting lens assembly 30 from the second position to the first position through or past the intermediate position, the direction of rotation of the shaft 76 is correspondingly reversed and, therefore, the mirror carriage 70 is moved from the second position to the first position through or past the intermediate position in a manner reverse to the movement thereof from the first position to the second position through or past the intermediate position.

In general, in view of the fact that the projecting lens assembly 30 is comprised of a complex of optical lens elements, the manufacture of the projecting lens assembly usually involves an error in focal length within 1% which would adversely affect the conjugate length. Where the distance of travel of the projecting lens assembly 30 between the first and intermediate position and also between the intermediate position and the second position is fixed such as in the illustrated embodiment, the error in focal length of the projecting lens assembly 30 must be compensated for by adjusting the distance of travel of the mirror carriage 70, that is, by finely adjusting the first, intermediate and second positions of the mirror carriage 70.

In particular, the first position of the mirror carriage 70 can be finely adjusted by moving the plate 72 in either direction parallel to the longitudinal axis of any one of the slots 73. The intermediate position of the mirror carriage 70 can also be finely adjusted by turning the adjustment member 84 to adjust the angular displacement between the levers 79 and 80 about the longitudinal axis of the shaft 81. Moreover, the second position of the mirror carriage 70 can finely be adjusted by turning the adjustable stopper 87 with which the abutment 79a engages when the mirror carriage 70 is held in the second position as shown in FIG. 13(c).

Although the present invention has fully been described in connection with the preferred embodiment thereof with reference to the accompanying drawings, it is to be noted that various changes and modifications will be apparent to those skilled in the art. By way of example, although in the foregoing description the x0.816 and x0.707 magnification modes have been described relative to the x1.0 magnification mode, that is, the full-size reproduction mode, the magnification need not be limited thereto and, moreover, the number of magnifications need not be limited to three. For example, the concept of the present invention can equally apply to a copying machine having a plurality of magnification modes including, in addition to the full-size reproduction mode, an enlarged size reproduction mode and a reduced size reproduction mode.

Furthermore, although the projecting lens assembly has been described as being movable to change the magnification modes, the concept of the present invention can equally apply even where separate lens assemblies of different focal lengths are employed and supported on a turret stepwisely rotatable so as to bring the separate lens assemblies into the optical path one at a time according to the described magnification.

Accordingly, such changes and modifications are to be understood as being included within the true scope of the present invention unless they depart therefrom.

We claim:

1. An electrophotographic copying machine of a type selectively operable in a plurality of magnifications, which comprises, in combination:

an original support for supporting thereon an original to be copied;

a photo-receptor movable past an exposure station;

an optical projecting means including a movably supported projecting lens and positioned between the original support and the photo-receptor for forming an optical path for projecting an image of the original onto the photo-receptor at the exposure station;

means connected to said projecting lens for varying the magnification of the image of the original formed by the optical projecting means between first and second magnifications by moving said projecting lens for varying said optical path, the second magnification being smaller than said first magnification; and an exposure adjustment means including a light shielding member fixedly positioned along said optical path in a non-interfering position relative to said optical path when said optical projecting means is projecting the image at said first magnification and in a position relative to said optical path for blocking part of the image light directed toward said projecting means when said projecting means is projecting the image at said second magnification for controlling the pattern of distribution of light carrying the image of the original on said photo-receptor when projecting at said second magnification.

2. A machine as claimed in claim 1, wherein said first magnification is X 1.0 and said second magnification is X 0.816.

3. A machine as claimed in claim 1, wherein said first magnification is X 1.0 and said second magnification is X 0.707.

4. A machine as claimed in claim 1, wherein said first magnification is X 1.0 and said second magnification is X 0.647.

5. A machine as claimed in claim 1, wherein said varying means further comprises means for varying the magnification to a third magnification which is smaller than said second magnification.

6. A machine as claimed in claim 5, wherein said first, second and third magnifications respectively are X 1.0, X 0.816 and X 0.707.

7. A machine as claimed in claim 5, wherein said first, second and third magnifications respectively are X 1.0, X 0.816 and X 0.647.

8. A machine as claimed in claim 5, wherein said first, second and third magnifications respectively are X 1.0, X 0.707 and X 0.647.

9. A machine as claimed in claim 5, wherein said varying means further comprises means for varying the magnification to a fourth magnification which is smaller than said third magnification.

10. A machine as claimed in claim 9, wherein said first, second, third and fourth magnifications respectively are X 1.0, X 0.816, X 0.707 and X 0.647.

11. An electrophotographic copying machine of a type selectively operable in a plurality of magnifications, which comprises, in combination:

an original support for supporting thereon an original to be copied;

a photo-receptor movable past an exposure station;

an optical projecting means positioned between the original support and the photo-receptor for forming an optical path for projecting an image of the original onto the photo-receptor at the exposure station, said optical projecting means including a movably supported projecting lens means;

means connected to said projecting lens means for moving the projecting lens means for varying the magnification of the image of the original relative to the original among a first, second and third magnifications for varying said optical path, said first magnification being larger than said second magnification and said second magnification being larger than said third magnification; and a fixedly supported light shielding member fixedly positioned along said optical path in a non-interfering position relative to said optical path when said optical projecting lens means is in a position for projecting the image at said first magnification and in a position relative to said optical path for blocking part of the image light directed toward said projecting means when said projecting lens means is in a position for projecting the image at said second and third magnifications for controlling the pattern of distribution of light carrying the image of the original on said photo receptor when projecting at said second or third magnifications respectively.

12. A machine as claimed in claim 11, wherein the position of said shielding member and the positions of said projecting lens means when said projecting means is projecting at said second and third magnifications are such that the part of said light blocked when said projecting lens means is projecting at said second magnification is smaller than that when projecting at said third magnification.

13. An electrophotographic copying machine of a type selectively operable in a plurality of magnifications, which comprises, in combination:

an original support for supporting thereon an original to be copied;

a photo-receptor movable past an exposure station;

an optical projecting means positioned between the original support and the photo-receptor for forming an optical path for projecting an image of the original onto the photo-receptor at the exposure station, said optical projecting means including a projecting lens means which is movably supported;

means connected to said projecting lens means for moving the projecting lens means for varying the magnification of the image of the original relative to the original among a first, second, third and fourth magnifications for varying said optical path, said magnifications being successively less in the order of said first, second, third and fourth magnifications; and a fixedly supported light shielding member fixedly positioned along said optical path in a non-interfering position relative to said optical path when said optical projecting lens means is in a position for projecting the image at said first magnification and in a position relative to said optical path for blocking part of the image light directed toward said projecting means when said projecting lens means is in a position for projecting the image at one of said second, third and fourth magnifications for controlling the pattern of distribution of light carrying the image of the original on said photo-receptor when projecting at said second, third and fourth magnifications respectively.

14. A machine as claimed in claim 13, wherein the position of said shielding member and the positions of said projecting lens means when projecting at said second, third and fourth magnifications are such that the part of said light which is blocked increases in the order of said second, third and fourth magnifications.

15. An electrophotographic copying machine of a slit exposure type selectively operable in a plurality of magnifications, which comprises, in combination:

an original support for supporting thereon an original to be copied;

a photo-receptor movable past an exposure station;

an optical projecting means including an exposure slit defining means and a movably supported projecting lens means and positioned between the original support and the photo-receptor for forming an optical path for projecting an image on the original in a line scan fashion through the exposure slit and the projecting lens means onto the photo-receptor at the exposure station;

means connected to said projecting lens means for moving said projecting lens means for varying the magnification of the image of the original formed by the optical projecting means between at least first and second magnifications, the second magnification being smaller than said first magnification; and an exposure adjustment means including a light sliding member fixedly positioned along said optical path in a non-interfering position relative to said optical path when said projecting lens means is projecting the image at said first magnification and in a position relative to said optical path for blocking part of the image light in a direction lengthwise of the exposure slit when said projecting means is projecting the image at said second magnification for controlling the pattern of distribution of light carrying the image of the original on said photo-receptor.

16. A machine as claimed in claim 15, wherein said varying means further comprises means for varying the magnification to a third magnification which is smaller than said second magnification, said exposure adjustment means being positioned relative to said optical path when said projecting means is projecting at said third magnification for blocking a part of the light in said optical path.

17. A machine as claimed in claim 16, wherein said exposure adjustment means blocks an amount of light when said projecting means is projecting at said third magnification which is larger than that blocked when said projecting means is projecting at said second magnification.

18. A machine as claimed in claim 16, wherein said varying means further comprises means for varying the magnification to a fourth magnification which is smaller than said third magnification, said exposure adjustment means being positioned relative to said optical path when projecting at said fourth magnification for blocking a part of the light in said optical path.

19. A machine as claimed in claim 15, wherein said exposure slit defining means and said light shielding member are positioned for causing said light shielding member, when said projecting lens means has been moved to said position for the second magnification, to block the image light from both ends of the lengthwise direction of the exposure slit.

20. An electrophotographic copying machine of a mirror scan type selectively operable in a plurality of magnification, which comprises, in combination:

an original support for supporting thereon an original to be copied;

a photo-receptor movable past an exposure station;

an optical projecting means positioned between the original support and the photo-receptor for forming an optical path for projecting an image of the original onto the photo-receptor at the exposure station, said optical projecting means including a movably supported projecting lens means, an exposure slit defining means and a scanning mirror assembly;

means connected to said projecting lens means for moving the projecting lens means for varying the magnification of the image of the original projected onto the photo-receptor by said optical projecting means between a first magnification and a second magnification by varying said optical path, said second magnification being smaller than said first magnification; and p1 a light shielding member fixedly positioned along said optical path in a non-interfering position relative to said optical path when said optical projecting means is projecting the image at said first magnification and in a position relative to said optical path for blocking part of the image light in a direction lengthwise of the exposure slit when said projecting means is projecting the image of said second magnification for controlling the pattern of distribution of light carrying the original image.

21. A machine as claimed in claim 20, wherein said varying means further includes means for varying the magnification to a third magnification smaller than said second magnification, and the position of said shielding member and said projecting lens means when said projecting means is projecting at said third magnification is such that the part of the light which is blocked is larger than when projecting at said second magnification.

22. A machine as claimed in claim 21, wherein said varying means further comprises means for varying the magnification to a fourth magnification which is smaller than said third magnification, said shielding member being positioned relative to said optical path when projecting at said fourth magnification for blocking a part of the light in said optical part larger than that blocked when projecting at said third magnification.

* * * * *